United States Patent [19]

Taira et al.

[11] Patent Number: 4,564,541
[45] Date of Patent: Jan. 14, 1986

[54] PLASTIC LAMINATE STRUCTURE AND VESSEL

[75] Inventors: Kazuo Taira, Tokyo; Akira Sakamoto, Yokohama; Muneki Yamada, Fujisawa; Masanori Aizawa, Yokohama; Hiroshi Ueno, Yokosuka, all of Japan

[73] Assignee: Toyo Seikan Kaisha, Ltd., Tokyo, Japan

[21] Appl. No.: 577,823

[22] Filed: Feb. 7, 1984

[30] Foreign Application Priority Data

Feb. 8, 1983 [JP] Japan .................................. 58-18041
Nov. 15, 1983 [JP] Japan ............................... 58-213334

[51] Int. Cl.[4] ...................... B65D 1/00; B32B 27/08; B32B 27/36
[52] U.S. Cl. .................................... 428/35; 428/355; 428/412; 428/480; 428/483; 428/500; 428/515
[58] Field of Search ................ 428/480, 35, 412, 355, 428/349, 483, 500, 515

[56] References Cited

U.S. PATENT DOCUMENTS

| 4,281,045 | 7/1981 | Sumi et al. ........................ 428/35 X |
| 4,299,934 | 11/1981 | Petke et al. ..................... 428/355 X |
| 4,407,897 | 10/1983 | Farrell et al. ....................... 428/516 |
| 4,415,649 | 11/1983 | Munger et al. ................. 428/355 X |
| 4,430,288 | 2/1984 | Bonis ................................ 428/35 X |

*Primary Examiner*—Thomas J. Herbert
*Attorney, Agent, or Firm*—Sherman & Shalloway

[57] ABSTRACT

Disclosed is a laminate structure comprising a layer of a creep-resistant resin composed mainly of ester recurring units and a gas barrier layer containing an olefin-vinyl alcohol copolymer, which are laminated through a thermoplastic resin adhesive layer, wherein the adhesive resin is composed of a copolyester or copolyester composition comprising in the main chain at least two acid components selected from (i) an isophthalic acid component, (ii) a terephthalic acid component and (iii) a linear or cyclic aliphatic dibasic acid component.

23 Claims, 4 Drawing Figures

PLASTIC LAMINATE STRUCTURE AND VESSEL

DESCRIPTION

BACKGROUND OF THE INVENTION (1) Field of the Invention

The present invention relates to a plastic laminate. More particularly, the present invention relates to a plastic laminate structure comprising a layer of a creep-resistant resin represented by polyethylene terephthalate and a gas barrier layer of an olefin-vinyl alcohol copolymer, which are tightly bonded to each other through a copolyester type adhesive layer. Furthermore, the present invention relates to a multi-layer plastic vessel which is excellent in the combination of the gas barrier property, creep resistance, rigidity, impact resistance, heat resistance, interlaminar peel strength and transparency and is valuable for sealing and storing contents such as foods for a long time.

(2) Description of the Prior Art

Polyethylene terephthalate is excellent in moldability and mechanical properties such as creep resistance and can be molecularly biaxially oriented. Accordingly, polyethylene terephthalate is widely used for a light-weight plastic vessel, especially a bottle for a drink, which is excellent in such properties as creep resistance, impact resistance, rigidity, gas barrier property, light weight characteristic, heat resistance and transparency. However, the gas permeability of this polyester bottle is still higher than that of a glass bottle and cannot be neglected. For example, it is said that the shelf life of a small polyester bottle having an inner volume smaller than 1 litter, which is filled with a carbonated drink such as cola, is about 2 months at longest.

An olefin-vinyl alcohol copolymer such as a saponified ethylene-vinyl acetate copolymer is known as a heat-formable resin excellent in the oxygen barrier property, and it also is known that this resin is combined with an olefin resin excellent in the moisture resistance and the laminate is used for the production of an undrawn or drawn multi-layer plastic vessel.

Formation of a vessel from a laminate structure comprising a polyester layer and an olefin-vinyl alcohol copolymer layer has already been proposed. It is naturally expected that this laminate structure will be excellent in the combination of the gas barrier property, creep resistance, heat resistance, impact resistance and rigidity, but this laminate structure has not practically been used for a vessel, especially a biaxially drawn blow-formed vessel. The reason is considered to be that a thermoplastic adhesive capable of forming a strong interlaminar bond between a polyester and an olefin-vinyl alcohol copolymer has not been found out.

SUMMARY OF THE INVENTION

We found that a thermoplastic resin adhesive composed mainly of a specific copolyester described hereinafter tightly bonds in the melted state a layer of a creep-resistant layer such as a polyester or polycarbonate to a layer of an olefin-vinyl alcohol copolymer layer and the interlaminar bonding force of this adhesive is not lost under conditions for blow forming, thermoforming, draw-blow forming, draw forming or other vessel-forming operation.

It is therefore a primary object of the present invention to provide a plastic laminate structure comprising a layer of a creep-resistant resin such as polyethylene terephthalate and a layer of an olefin-vinyl alcohol copolymer, which are tightly bonded to each other.

Another object of the present invention is to provide a plastic laminate structure which is excellent in the gas barrier property, creep resistance, impact resistance, rigidity, heat resistance, interlaminar peel strength and transparency and is valuable as a material for the production of a sealed vessel in the form of a bottle or cup.

More specifically, in accordance with the present invention, there is provided a laminate structure comprising a layer of a creep-resistant resin composed mainly of ester recurring units and a gas barrier layer containing an olefin-vinyl alcohol copolymer, which are laminated through a thermoplastic resin adhesive layer, wherein the adhesive resin is composed of a copolyester or copolyester composition comprising in the main chain at least two acid components selected from (i) an isophthalic acid component, (ii) a terephthalic acid component and (iii) a linear or cyclic aliphatic dibasic acid component.

In accordance with the present invention, there also is provided a sealing multi-layer plastic vessel comprising the above-mentioned laminate structure.

DETAILED DESCRIPTION OF THE PREFERRED EMBODIMENTS

Figure 1:
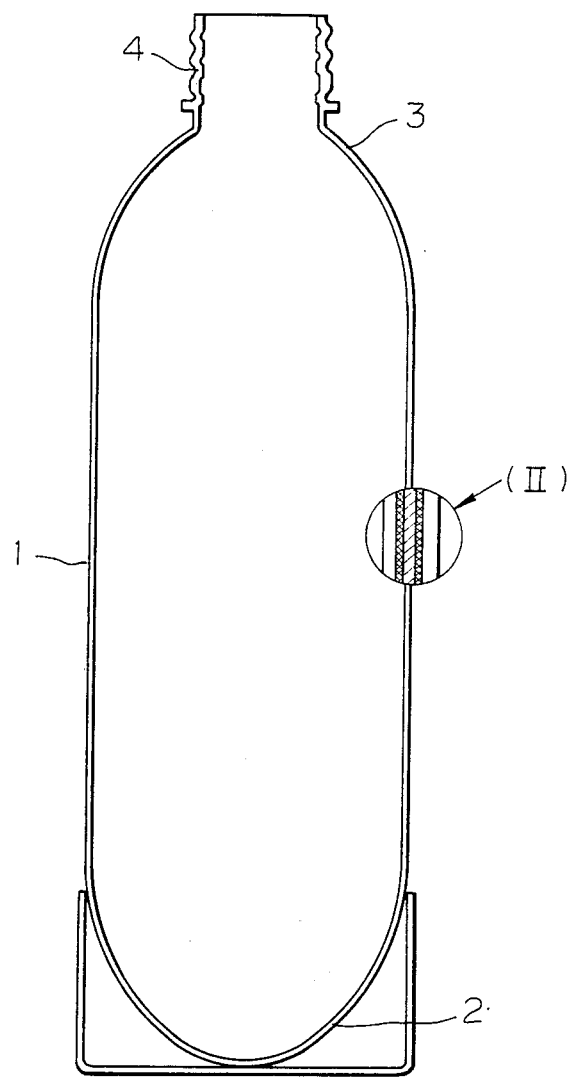
FIG. 1 is a sectional view of a draw-blow-formed vessel comprising a laminate structure of the present invention.

Referring to FIG. 1 illustrating an embodiment of a plastic laminate structure in the form of a bottle, this vessel comprises a barrel 1, a bottom 2 connected to the lower end of the barrel, a conical shoulder 3 connected to the upper end of the barrel and a neck 4 connected to the upper end of the shoulder, which are integrally formed from a multi-layer preform, described in detail hereinafter, by draw-blow forming.

This bottle is prepared by draw-blowing the preform biaxially, that is, by mechanically drawing the preform in the axial direction of the vessel and blowing a fluid into the preform to draw the preform in the circumferential direction. Accordingly, the resin constituting the barrel of the bottle is molecularly biaxially oriented, that is, in both the axial direction and circumferential direction of the bottle.

Figure 2:
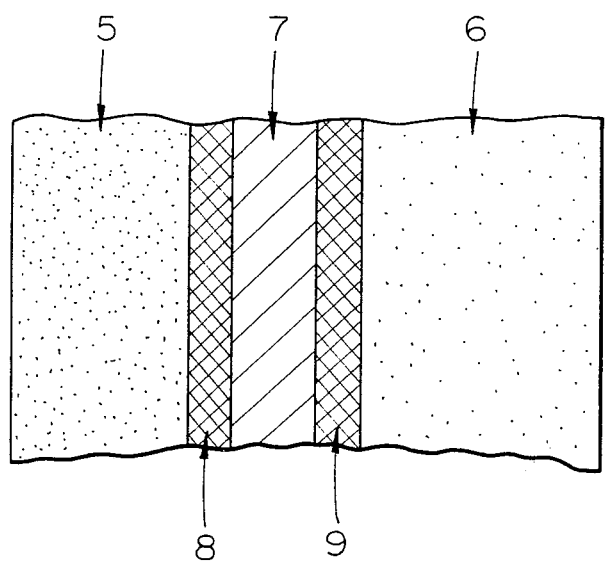
FIG. 2 is an enlarged view showing the sectional structure (II) of the vessel shown in FIG. 1.
Figure 3:
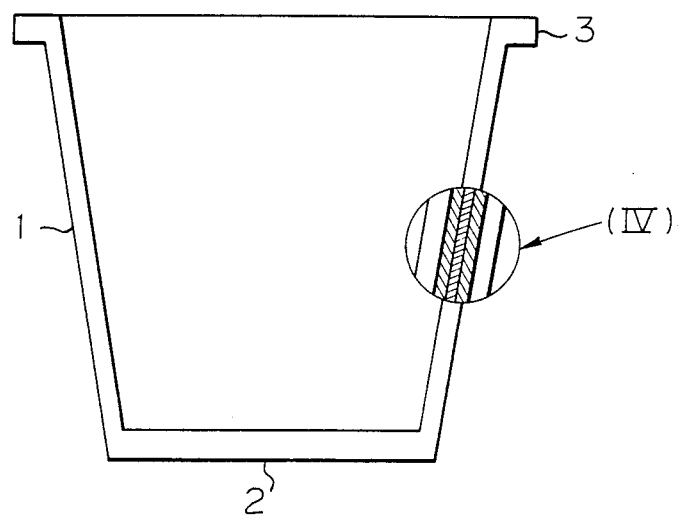
FIG. 3 is a sectional side view showing an embodiment of a plastic laminate structure in the form of a cup.
Figure 4:
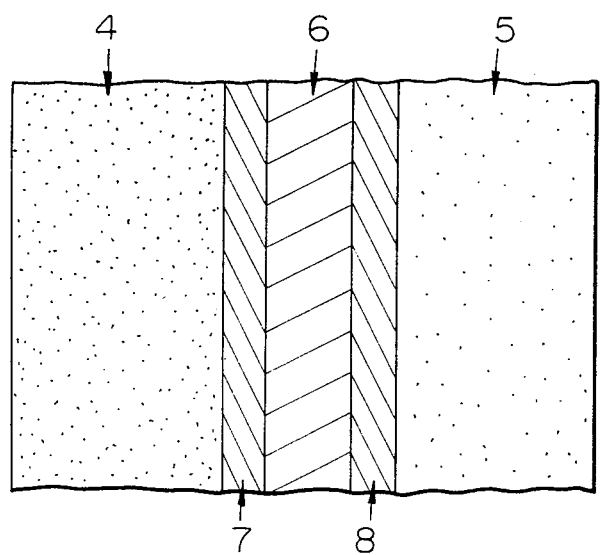
FIG. 4 is an enlarged view showing the section of the laminate structure (IV) shown in FIG. 3.

Referring to FIG. 2 which is an enlarged view showing the section of the wall of the barrel of the bottle shown in FIG. 1, the wall of the barrel comprises an inner surface layer of a polyester composed mainly of ethylene terephthalate units, an outer surface layer composed of the same polyester, and an intermediate gas barrier layer 7 containing an olefin-vinyl alcohol copolymer interposed between the inner and outer surface layers 5 and 6. These polyester layers 5 and 6 are tightly heat-bonded to the gas barrier layer 7 through adhesive layers 8 and 9 containing a copolyester described in detail hereinafter.

The present invention is characterized in that the creep-resistant resin layers 5 and 6 are heat-bonded to the olefin-vinyl alcohol copolymer-containing gas barrier layer 7 through an adhesive layer composed of a copolyester or copolyester composition comprising in the main chain at least two acid components selected from (i) an isophthalic acid component, (ii) a terephthalic acid component and (iii) a linear or cyclic aliphatic dibasic acid component.

The present invention utilizes the phenomenon that the above-mentioned specific copolyester adhesive forms a strong bond by heating between a creep-resistant resin composed of ester recurring units, such as polyethylene terephthalate, polybutylene terephthalate, polycarbonate or polyacrylate and an olefin-vinyl alcohol copolymer.

In the copolyester used in the present invention, the dibasic acid components are included in the polyester chain in the form of a combination of isophthalic acid and terephthalic acid or a combination of isophthalic acid and/or terephthalic acid with a linear or cyclic aliphatic dibasic acid.

From the viewpoint of the heat bondability to the olefin-vinyl alcohol copolymer, it is important that the copolyester should comprise in the main chain at least two dibasic acid components selected from the above-mentioned dibasic acid components (i) through (iii). Furthermore, from the viewpoint of the bondability to the creep-resistant resin, it is important that the aromatic dibasic acid component (i) and/or the aromatic dibasic acid component (ii) should be contained in the main chain.

In connection with the copolyester to be used for heat bonding of an olefin-vinyl alcohol copolymer to a creep-resistant resin such as polyethylene terephthalate, not only the bonding force or affinity to the two resin layers but also the crystallinity or physical characteristics of the copolyester per se should be taken into consideration. The reasons why the copolyester used in the present invention has an excellent bondability to both the olefin-vinyl alcohol copolymer and the creep-resistant resin, the strength of this bonding is not changed with the lapse of time and reduction of the bonding strength is very small even if the bonded structure is subjected to the forming operation such as draw forming are considered to be as follows.

The copolyester used in the present invention comprises relatively hard or rigid ester segments derived from the aromatic dibasic acid component and relatively flexible or soft segments derived from the isophthalic acid or aliphatic dibasic acid component. Because of the presence of the relatively flexible or soft segments, the copolyester chain is liable to have an easily mobile structure, and the probability of formation of a hydrogen bond between the hydroxyl group of the olefin-vinyl alcohol copolymer and the ester carbonyl group or ether group is increased and the degree of actual formation of the hydrogen bond is increased. Furthermore, since the copolyester has aromatic ester segments, the copolyester is tightly bonded to the creep-resistant resin having similar aromatic ester segments.

As the inherent problem of the heat adhesive, there can be mentioned a crystallization tendency of the heat adhesive resin. The bonding of the olefin-vinyl alcohol copolymer to the creep-resistant resin should naturally be performed in the state where the copolyester is melted. If this copolyester is crystallized during cooling to room temperature from the melted state or during standing for a certain period or at the forming step such as the draw-forming step, the bonding strength is drastically reduced by molecular orientation due to crystallization or by changes of the physical properties due to crystallization. Since the copolyester used in the present invention contains the isophthalic acid component and-/or the aliphatic dibasic acid component, the crystallinity of the copolyester is drastically reduced, and since the crystallization speed of the copolyester is increased by the isophthalic acid component and/or the aliphatic acid component, the maximum crystallization degree that the copolyester can take is controlled to a very low level and crystallization with the lapse of time is inhibited, with the result that the bonding strength is stabilized.

Furthermore, since the copolyester used in the present invention contains at least two dibasic acid components selected from the above-mentioned dibasic acid components (i) through (iii), the glass transition temperature (Tg) of the copolyester is controlled to a relatively low level, molecular orientation or orientation crystallization of the adhesive resin is prevented at the forming step such as the draw-forming step, or degradation of the adhesion is controlled at the forming step.

In case of an adhesive resin having highly elastomeric characteristics, the stress is left in the bonding interface under conditions for the forming operation such as draw forming, resulting in degradation of the adhesion. In contrast, in the copolyester used in the present invention, since hard ester segments and soft ester segments are contained with a good balance, it is considered that the adhesive layer has a softness enough to resist the forming operation and the stress left in the bonding interface is reduced.

The copolyester used in the present invention may be an optional copolyester or copolyester composition satisfying the above-mentioned condition.

For example, copolyesters comprising recurring units represented by the following formula:

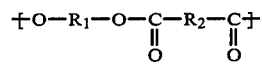

wherein $R_1$ stands for an aliphatic divalent hydrocarbon group, and $R_2$ stands for a divalent hydrocarbon group composed mainly of a p-phenylene group, an m-phenylene group or a linear or cyclic aliphatic hydrocarbon group, with the proviso that at least two kinds of these groups are present in all the recurring units, may be used singly or in the form of a blend of two or more of them.

Benzene-dicarboxylic acids such as isophthalic acid and terephthalic acid are preferred as the aromatic dibasic acid component. Furthermore, naphthalenedicarboxylic acid, diphenyl-dicarboxylic acid, diphenylmethane-dicarboxylic acid and 2,2-bis(4-carboxyphenyl)-propane can be used.

Linear or cyclic aliphatic dibasic acids may be used. As the linear dicarboxylic acid, there can be mentioned succinic acid, fumaric acid, maleic acid, adipic acid, azelaic acid, sebacic acid, 1,8-octane-dicarboxylic acid, 1,10-decane-dicarboxylic acid, 1,12-dodecanedicarboxylic acid, 1,12-dodecane-dicarboxylic acid and dimer acid. As the cyclic aliphatic dicarboxylic acid, there can be mentioned 1,2-cyclohexane-dicarboxylic acid, 1,3-cyclohexane-dicarboxylic acid and 1,4-cyclohexanedicarboxylic acid.

As the glycol component, there can be mentioned ethylene glycol, propylene glycol, 1,4-butane-diol, neopentyl glycol, cyclohexane-diol, xylene glycol and hexahydroxylylene glycol.

It is preferred that the copolyester used in the present invention should comprise 1,4-butane-diol as the main glycol component. Namely, a copolyester comprising 1,4-butane-diol as the glycol component has a higher bonding force to the olefin-vinyl alcohol copolymer than a copolyester comprising other glycol component, and when this copolyester is used, reduction of the bonding force in the laminate with the lapse of time or degradation of the adhesion at the forming step is controlled to a very low level.

In accordance with one embodiment of the present invention, a copolyester containing isophthalic acid and terephthalic acid components in combination in the main chain is used.

In the copolyester of this type used in the present invention, the molar ratio between terephthalic acid and isophthalic acid can be changed within a considerably broad range as shown in Tables 1 and 2 given hereinafter. Of the dibasic acid components of this copolyester, the terephthalic acid component has a relation to the heat bondability to the creep-resistant resin layer such as a polyethylene terephthalate layer and also has a relation to the mechanical strength or heat resistance of the copolyester of the adhesive per se. On the other hand, the isophthalic acid component has a relation to the heat bondability to the olefin-vinyl alcohol copolymer layer and makes contributions to the improvement of the heat bondability by reduction of the melting point of the copolyester and to the improvement of such properties of the copolyester as the elasticity and flexibility. From the results shown in Tables 1 and 2, it will readily be understood that if the amount of isophthalic acid is at least 5 mole % based on the dibasic acid components in the copolyester, the adhesion strength to the ethylene-vinyl alcohol copolymer can prominently be improved.

If the content of terephthalic acid in the dibasic acid components is reduced, the bonding force to polyethylene terephthalate is reduced but this bonding force is still higher than the bonding force to the ethylenevinyl alcohol copolymer. It is generally preferred that the terephthalic acid/isophthalic acid molar ratio be in the range of from 95/5 to 35/65. In the case where the bonding force to polyethylene terephthalate may be at the same level as the bonding force to the ethylene-vinyl alcohol copolymer, the content of terephthalic acid in the dibasic acids may be as low as about 10 mole %.

In accordance with one preferred embodiment of the present invention, a copolyester or copolyester composition comprising at least 25 mole % of an aromatic dibasic acid component and 5 to 75 mole % of a linear or cyclic aliphatic dibasic acid component is used for the adhesive layer. From the viewpoint of the bondability to the olefin-vinyl alcohol copolymer, it is important that this copolyester should contain in the main chain an aliphatic dibasic acid component in an amount of 5 to 75 mole %, especially 10 to 70 mole %, based on the dibasic acid components. From the viewpoint of the bondability to the creep-resistant resin, it is important that an aromatic acid component should be contained in the main chain in an amount of at least 25 mole % based on the dibasic acid components.

A copolyester free of an aliphatic dibasic acid component or a copolyester in which the content of an aliphatic dibasic acid component is lower than 5 mole % based on the total dibasic acid components is generally poor in the heat bondability to an olefin-vinyl alcohol copolymer, and even if a high adhesion strength is obtained just after the heat bonding, the adhesion strength is drastically reduced with the lapse of time and extreme reduction of the adhesion strength is readily caused in the laminate structure at the forming step such as the draw-forming step.

A copolyester in which the content of the aliphatic dibasic acid component is higher than 75 mole %, that is, a copolyester in which the content of the aromatic dibasic acid component is lower than 25 mole %, is generally poor in the heat bondability to a creep-resistant resin such as polyethylene terephthalate, and the adhesion strength to the creep-resistant resin is readily reduced with the lapse of time or at the forming step such as the draw-forming step.

These facts will become apparent from the results shown in Examples and Comparative Examples given hereinafter.

In accordance with another preferred embodiment of the present invention, a copolyester comprising an isophthalic acid component in an amount of at least 5 mole % based on the total dibasic acid components is used. More specifically, a copolyester derived from isophthalic acid has a higher bondability to an olefin-vinyl alcohol copolymer than a copolyester derived from terephthalic acid, when the comparison is made based on the same aromatic dibasic acid component content. It is considered that since isophthalic acid ester units form a more readily mobile polyester chain structure than p-oriented terephthalic acid ester units, bondability to the olefin-vinyl alcohol copolymer is improved in the above-mentioned copolyester.

It is preferred that the aliphatic dibasic acid component contained in the copolyester be composed mainly of a dibasic acid having 4 to 12 carbon atoms, especially 5 to 12 carbon atoms. If the carbon number of the aliphatic dibasic acid is larger than 12, the bonding force to the ethylene-vinyl alcohol copolymer tends to decrease, and if the carbon number is smaller than 4, the water resistance of the copolyester is reduced and the adhesion strength is reduced with the lapse of time.

The copolyester used in the present invention is composed mainly of the above-mentioned recurring units, but it may comprise minor amounts of other ester recurring units so far as the essential characteristics of the copolyester are not impaired.

It is preferred that the copolyester used in the present invention should have a glass transition temperature (Tg) of $-40°$ to $75°$ C., especially $-40°$ to $40°$ C. If the glass transition temperature Tg is too high and exceeds the above range, the adhesion strength is considerably reduced when the laminate is subjected to the forming operation such as the draw-forming operation. The reason is considered to be that if the glass transition temperature is too high, in the copolyester adhesive layer, molecular orientation or orientation crystallization is caused at the forming step or even when the copolyester has a high softness and is highly elastomeric, the elastic recovery stress is readily left in the bonding interface after the forming operation, and no good bonding force is obtained in each case. If the glass transition temperature Tg of the copolyester is too low and below the above range, the cohesive force of the copolyester per se at a temperature close to room temperature is drastically reduced, and also the bonding force is extremely reduced and reduction of the bonding force with the lapse of time becomes prominent. Furthermore, when the laminate structure is formed into a vessel, the appearance and dimension stability are drastically reduced.

It is ordinarily preferred that the intrinsic viscosity [η] of the copolyester used in the present invention be 0.3 to 2.8 dl/g, especially 0.4 to 1.8 dl/g, as measured at a temperature of 30° C. in a mixed solvent comprising phenol and tetrachloroethane at a weight ratio of 60/40. From the viewpoint of the adaptability to the heat bonding operation, it is preferred that the softening point of the copolyester be lower than 230° C., especially −30° to 200° C., as measured according to the method described in the example.

The above-mentioned copolyesters may be used singly or in the form of a blend of two or more of them. Furthermore, the copolyester may be used in the form of a blend with other thermoplastic resin, for example, an olefin resin such as polyethylene, polypropylene, an ethylene-propylene copolymer, an ethylene-butene-1 copolymer, an ion-crosslinked olefin copolymer (ionomer), an ethylene-vinyl acetate copolymer, an ethylene-acrylic acid copolymer, ethylene-ethyl acrylate copolymer, acid-modified polyethylene or acid-modified polypropylene. The olefin resin is used in an amount of up to 50% by weight, especially up to 30% by weight, based on the total adhesive.

When the laminate structure of the present invention is used as a film or sheet, especially for the production of a vessel, in order to prevent deformation under application of a pressure and also from the viewpoint of the mechanical strength or water resistance, the creep-resistant resin layer should comprise ester recurring units.

A creep-resistant resin having such rheological properties that the sum of the initial elasticity modulus (Eg) and delayed elasticity modulus (El), as measured at a temperature of 23° C. and a stress of $7 \times 10^7$ dyne/cm$^2$ is at least $1 \times 10^{10}$ dyne/cm$^2$, the steady flow viscosity coefficient ($\eta_\infty$) is at least $1 \times 10^{17}$ dyne/cm$^2$ and the delay time ($t_R$) is less than $6 \times 10^6$ sec is advantageously used.

Ordinarily, when a stress S is applied to a viscoelastomer such as a thermoplastic polymer for a time t, with increase of the time t, not only influences of the elasticity but also influences of the viscosity are manifested and the system shows viscoelastic behaviors, and when the time t is sufficiently large, the viscous flow is caused. These viscoelastic behaviors can be typically represented by such characteristics as the above-mentioned factors Eg, El, $\eta_\infty$ and $t_R$.

When the formed vessel is used as a pressure-resistant vessel such as a carbonated drink vessel or an aerosol vessel, the material constituting the vessel wall is required to have not only an excellent gas barrier property but also an appropriate hardness capable of resisting the pressure of the content and a good combination of the creep resistance and impact resistance.

Of the above-mentioned viscoelastic characteristics, the sum (Eg+El) of the initial elasticity modulus and delayed elasticity modulus has a relation to the hardness of the vessel. In the present invention, from the viewpoint of the pressure resistance, it is important that the value of (Eg+El) should be at least $1 \times 10^{10}$ dyne/cm$^2$, especially at least $2 \times 10^{10}$ dyne/cm$^2$, as measured at a temperature of 23° C. and a stress of $7 \times 10^7$ dyne/cm$^2$. The steady flow viscosity coefficient ($\eta_\infty$) and delay time ($t_R$) have a relation to the creep resistance. In the present invention, in order to prevent the creep, it is important that the value $\eta_\infty$ should be at least $1 \times 10^{17}$ poise, especially at least $5 \times 10^{17}$ poise, and $t_R$ should be less than $6 \times 10^6$ sec, especially less than $3 \times 10^6$ sec.

In view of these characteristics, as the thermoplastic resin suitable for attaining the objects of the present invention, there can be mentioned, in the order of importance, polyethylene terephthalate (PET), polybutylene terephthalate (PBT), polycarbonate (PC) and polyacrylate (PAR). Blends of two or more of these resins can also be used. Furthermore, other thermoplastic resin may be blended, so far as the creep resistance is not impaired. The above-mentioned polyesters may be used in the form of so-called homopolymers, but in order to improve the characteristics at the heat forming step, small amounts of comonomers may be introduced into the main chains. For example, modified PET or modified PBT in which hexahydroxylylene glycol is incorporated as the glycol component for improving the drawdown characteristic can be used for attaining the objects of the present invention. The polycarbonate is a poly(carbonic acid ester) derived from a dihydroxy compound and phosgene. For example, there can be mentioned poly-p-xylyleneglycol biscarbonate, polydihydroxydiphenylmethane carbonate, polydihydroxydiphenyl-2,2-propane carbonate and polydihydroxydiphenyl-1,1-ethane carbonate. As the polyarylate, there can be mentioned a polymer comprising ester recurring units derived from terephthalic acid and/or isophthalic acid and a bisphenol.

Ordinarily, the creep-resistant resin should have a film-forming molecular weight.

As the olefin-vinyl alcohol copolymer, there can be used a copolymer comprising units of an olefin such as ethylene or propylene and vinyl alcohol units obtained by saponifying units of a vinyl ester such as vinyl acetate. From the viewpoint of the gas barrier property and moisture resistance, it is important that the olefin-vinyl alcohol copolymer should contain 40 to 80 mole %, especially 50 to 75 mole %, of the vinyl alcohol units, and the content of the residual vinyl ester units should be lower than 4 mole %, especially lower than 1 mole %. It is preferred that the olefin-vinyl alcohol copolymer should have an intrinsic viscosity [η] of 0.7 to 1.7 dl/g as measured at 30° C. in a mixed solvent comprising phenol and water at a weight ratio of 85/15.

The olefin-vinyl alcohol copolymer alone may be used for the gas barrier layer. Furthermore, this copolymer may be used in the form of a blend with other thermoplastic resin for the gas barrier layer. As a preferred example of the blend, there can be mentioned a blend comprising an olefin-vinyl alcohol copolymer and a polyamide at a weight ratio of from 95/5 to 40/60, especially from 90/10 to 50/50. As described in Japanese Patent Publication No. 42493/82, this blend has a small oxygen permeation coefficient almost comparable to that of the olefin-vinyl alcohol copolymer and is excellent in the adaptability to the draw-forming operation. Accordingly, this blend is advantageously used for the production of a draw-blow-formed vessel or a sheet-formed vessel by drawing.

In the laminate structure of the present invention, the layer arrangement is not particularly critical, so far as the copolyester adhesive layer (CAP) is interposed between the creep-resistant resin layer (PT) and the olefin-vinyl alcohol copolymer layer (PEVA). For example, there can optionally be adopted a symmetric five-layer structure of PT/CAP/PEVA/CAP/PT shown in the drawings, a three-layer structure of PT/CAP/PEVA, and a four-layer structure of PT/CAP/PEVA/CAP.

Scraps formed by pulverizing defective articles in the vessel-forming process may be incorporated in the creep-resistant resin. In the present invention, there may be adopted laminate structures including a scrap layer (SR), such as a six-layer structure of SR/PT/CAP/PEVA/CAP/PT or PT/SR/CAP/PEVA/CAP/PT, and a seven-layer structure of SR/PT/CAP/PEVA/CAP/PT/SR or PT/SR/CAP/PEVA/CAP/SR/PT.

The thickness of each of the foregoing three layers may optionally be changed. However, in order to obtain an optimum combination of the gas barrier property, impact resistance, rigidity, heat resistance and interlaminar peel strength, it is preferred that the PT layer be thickest and the CAP and PEVA layers be thinner than the PT layer. More specifically, it is preferred that the PT/PEVA thickness ratio be in the range of from 100/1 to 5/1 and the PEVA/CAP thickness ratio be in the range of from 10/1 to 1/2. It is preferred that the entire thickness of the laminate in the form of a final vessel be 50 to 3000 microns, especially 100 to 2000 microns.

The laminate is formed preferably by co-extrusion of multiple layers. Since two resins are sufficiently mingled in the bonding interface between two adjacent resin layers if this co-extrusion is adopted, a laminate structure having an especially high adhesion strength can be obtained. In this co-extrusion method, the creep-resistant resin, gas barrier resin and copolyester adhesive are independently melt-kneaded in extruders for the respective resins, these resins are extruded through a multi-layer multi-ply die so that the copolyester is interposed between the creep-resistant resin layer and gas barrier resin layer, and the extrudate is formed into a film, a sheet, a pipe for a bottle or a preform for a bottle. Incidentally, a preform for a bottle is obtained by subjecting a molten resin parison formed by co-extrusion to preliminary blow forming in a mold or by cooling a pipe formed by co-extrusion, cutting the pipe into a predetermined length, heating the upper and lower end portions of the cut pipe again and forming a mouth screw and a bottom by compression forming or the like.

Formation of the laminate can also be accomplished according to the sandwich lamination method or extrusion coating method. For example, a copolyester adhesive is extruded in the form of a film between a preformed film of a creep-resistant resin such as polyethylene terephthalate and a preformed film of an olefin-vinyl alcohol copolymer, and the assembly is pressed, if necessary under heating, whereby a laminate structure is formed. According to another method, an olefin-vinyl alcohol copolymer as an intermediate layer and a copolyester adhesive as inner and outer layers are simultaneously extruded between two films of a creep-resistant resin, and the simultaneously extruded layers are sandwiched with the creep-resistant resin films and the assembly is pressed, whereby a laminate structure is obtained. Furthermore, there may be adopted a method in which a copolyester adhesive and an olefin-vinyl alcohol copolymer are extrustion-coated in succession on the surface of a creep-resistant resin film, and a method in which three kinds of preformed films are heat-pressed or heat-rolled in the above-mentioned lamination order.

Moreover, for formation of a multi-layer preform, there may be adopted a method in which a copolyester adhesive and an olefin-vinyl alcohol copolymer are inejcted in succession on the inner or outer surface of a bottomed preform composed of a creep-resistant resin such as polyethylene terephthalate, whereby a preform having a multi-layer structure is prepared.

The laminate structure of the present invention is especially valuable for the production of a draw-blow-formed vessel or a sheet-formed vessel by drawing. For example, draw-blow forming can be performed according to known procedures except that the above-mentioned multi-layer preform is used. At first, the multi-layer preform is preliminarily heated at a drawing temperature before draw blowing. This drawing temperature is a temperature lower than the crystallization temperature of the polyester used, at which drawing of the multi-layer preform is possible. For example, in case of polyethylene terephthalate, the drawing temperature is 80° to 130° C., especially 90° to 110° C.

Draw-blow forming of the preliminarily heated preform is accomplished by known means such as sequential draw-blow forming or simultaneous draw-blow forming. For example, in case of sequential draw-blow forming, the preform is drawn in the axial direction by blowing a fluid under a relatively low pressure, and the preform is expanded and drawn in the circumferential direction of the vessel by blowing a fluid under a relatively high pressure. In case of simultaneous draw-blow forming, drawing in the circumferential direction and drawing in the axial direction are simultaneously performed while blowing a fluid under a high pressure. Drawing of the preform in the axial direction can easily be accomplished, for example, by gripping the neck of the preform between a mold and a mandrel, applying a drawing rod to the inner surface of the bottom of the preform and stretching the drawing rod. It is preferred that the draw ratio be 1.5 to 2.5 in the axial direction and 1.7 to 4.0 in the circumferential direction.

In the barrel of the draw-blow-formed vessel, the polyethylene terephthalate layer is molecularly oriented so that the density of the polyethylene terephthalate layer is in the range of 1.350 to 1.402 g/cm$^3$, whereby good impact resistance, rigidity and transparency desirable for a bottle-shaped vessel are obtained, and because of the presence of the olefin-vinyl alcohol copolymer layer, an excellent barrier property to oxygen, nitrogen, carbon dioxide gas and fragrance can be obtained. Furthermore, an excellent interlaminar adhesion can be maintained by the presence of the interposed copolyester adhesive layer.

For the production of a sheet-formed vessel, the above-mentioned multi-layer film or sheet is preliminarily heated at the above-mentioned drawing temperature, and the heated film or sheet is formed into a cup by vacuum forming, air-pressure forming, plug-assist forming or press forming.

The present invention will now be described in detail with reference to the following Examples that by no means limit the scope of the invention.

EXAMPLE 1

Molar ratios of ingredients in adhesive compositions used in this Example are shown in Table 1. These adhesive compositions were prepared according to the following method.

A four-neck flask was charged with predetermined amounts of a phthalic acid ester such as dimethyl terephthalate (hereinafter referred to as "DMT") or dimethyl isophthalate (hereinafter referred to as "DMI"), a glycol such as ethylene glycol (hereinafter referred to as "EG") or 1,4-butane-diol (hereinafter referred to as "BD") and a catalyst, and ester exchange reaction was carried out with stirring. The reaction was started at 165° C. and the temperature was elevated to 200° C. at a rate of 0.5° C. per minute. Within 85 minutes from the start of the reaction, methanol was distilled in an amount corresponding to 90% of the theoretical amount. Then, a predetermined amount of trimethyl phosphite (hereinafter referred to as "TMPA") was added to the reaction mixture at 200° C. and the reaction was conducted for 35 minutes. Then, the temperature was elevated to 240° C. over a period of 30 minutes to effect esterification. Then, the temperature was elevated to 265° C. and polymerization was conducted under 0.1 mmHg for 4 to 6 hours.

The final composition of the obtained polymer was determined by the proton NMR analysis and gas chromatography. The determined composition is expressed by mole % in Table 1.

Twenty four kinds of the so-formed adhesive compositions (CAP-1 through CAP-24) were formed into films by a hot press and were rapidly cooled in water to form samples. These adhesive films were laminated with a biaxially drawn polyethylene terephthalate film (hereinafter referred to as "PET-F"), a biaxially drawn polybutylene terephthalate film (hereinafter referred to as "PBT-F"), a polycarbonate film (hereinafter referred to as "PC-F"), a polyarylate film (hereinafter referred to as "PAR-F") or a film of an ethylene-vinyl alcohol copolymer having a vinyl alcohol content of 56 mole %, an ethylene content of 43.6 mole % and a residual vinyl ester content of 0.4 mole % (hereinafter referred to as "PEVA-F") by using a hot press. Each of the films laminated with the adhesive films had a thickness of 200 microns. Formation of these laminated films was accomplished according to the method in which the above-mentioned 24 adhesive films were piled on PET-F, PBT-F, PC-F, PAR-F or PEVA-F, kept under no compression in a hot press maintained at 270° C. for 120 seconds and then kept under a pressure of 5 kg/cm² for 60 seconds.

Specimens having a width of 10 mm were sampled from the resulting laminated films, and the T-peel test was carried out at a tensile speed of 100 mm/min in a tensile tester. The obtained results are shown in Table 2.

TABLE 1

| | Composition of Adhesive | | | |
|---|---|---|---|---|
| | Phthalic Acid Ester Component (mole %) | | Glycol Component (mole %) | |
| Adhesive | dimethyl terephthalate (DMT) | dimethyl isophthalate (DMI) | 1,4-butane-diol (BD) | ethylene glycol (EG) |
| CAP-1 | 100 | 0 | 100 | |
| CAP-2 | 95 | 5 | 100 | |
| CAP-3 | 90 | 10 | 100 | |
| CAP-4 | 85 | 15 | 100 | |
| CAP-5 | 80 | 20 | 100 | |
| CAP-6 | 70 | 30 | 100 | |
| CAP-7 | 60 | 40 | 100 | |
| CAP-8 | 55 | 45 | 100 | |
| CAP-9 | 50 | 50 | 100 | |
| CAP-10 | 45 | 55 | 100 | |
| CAP-11 | 40 | 60 | 100 | |
| CAP-12 | 35 | 65 | 100 | |
| CAP-13 | 100 | 0 | | 100 |
| CAP-14 | 95 | 5 | | 100 |
| CAP-15 | 90 | 10 | | 100 |
| CAP-16 | 85 | 15 | | 100 |
| CAP-17 | 80 | 20 | | 100 |
| CAP-18 | 70 | 30 | | 100 |
| CAP-19 | 60 | 40 | | 100 |
| CAP-20 | 55 | 45 | | 100 |
| CAP-21 | 50 | 50 | | 100 |
| CAP-22 | 45 | 55 | | 100 |
| CAP-23 | 40 | 60 | | 100 |
| CAP-24 | 35 | 65 | | 100 |

TABLE 2

| | Adhesion Strength (g/10 mm width: T-peel) | | | | |
|---|---|---|---|---|---|
| Adhesive | polyethylene terephthalate (PET-F) | polybutylene terephthalate (PBT-F) | polycarbonate (PC-F) | polyarylate (PAR-F) | ethylene-vinyl alcohol copolymer (PEVA-F) |
| CAP-1 | peeling impossible | peeling impossible | peeling impossible | 5100 | 78 |
| CAP-2 | peeling impossible | peeling impossible | peeling impossible | 5250 | 1060 |
| CAP-3 | 4640 | peeling impossible | 4670 | 5400 | 1450 |
| CAP-4 | 4280 | 5960 | 3980 | 5600 | 1680 |
| CAP-5 | 3820 | 5630 | 3760 | 5760 | 1780 |
| CAP-6 | 3660 | 5310 | 3440 | 5800 | 1890 |
| CAP-7 | 3440 | 4850 | 2980 | 5840 | 1810 |
| CAP-8 | 3280 | 4640 | 2750 | peeling impossible | 1750 |
| CAP-9 | 2770 | 4430 | 2530 | peeling impossible | 1540 |
| CAP-10 | 2550 | 4220 | 2310 | peeling | 1290 |

TABLE 2-continued

| Adhesive | Adhesion Strength (g/10 mm width: T-peel) | | | | |
|---|---|---|---|---|---|
| | polyethylene terephthalate (PET-F) | polybutylene terephthalate (PBT-F) | polycarbonate (PC-F) | polyarylate (PAR-F) | ethylene-vinyl alcohol copolymer (PEVA-F) |
| CAP-11 | 2330 | 3750 | 1880 | impossible peeling | 1090 |
| CAP-12 | 2190 | 3510 | 1550 | 5980 | 920 |
| CAP-13 | peeling impossible | peeling impossible | peeling impossible | 5000 | 63 |
| CAP-14 | peeling impossible | peeling impossible | peeling impossible | 5100 | 1000 |
| CAP-15 | peeling impossible | 4770 | 4610 | 5200 | 1220 |
| CAP-16 | 5330 | 4580 | 4210 | 5300 | 1390 |
| CAP-17 | 4850 | 4340 | 3800 | 5400 | 1430 |
| CAP-18 | 4640 | 3910 | 3510 | peeling impossible | 1490 |
| CAP-19 | 4430 | 3720 | 3220 | peeling impossible | 1320 |
| CAP-20 | 4280 | 3550 | 2910 | peeling impossible | 1290 |
| CAP-21 | 3730 | 3380 | 2720 | peeling impossible | 1110 |
| CAP-22 | 3510 | 3190 | 2550 | peeling impossible | 1040 |
| CAP-23 | 3320 | 2900 | 2180 | peeling impossible | 1010 |
| CAP-24 | 3190 | 2710 | 1870 | peeling impossible | 900 |

EXAMPLE 2

Adhesive resin compositions were prepared by melt-mixing the polyester type adhesive resins CAP-6 and CAP-16 used in Example 1 at weight ratios of 10/90, 20/80, 30/70, 40/60, 50/50, 60/40, 70/30, 80/20 and 90/10.

Nine adhesive films having a thickness of 80 to 100 microns were prepared from these adhesive resin compositions (referred to as "adhesives CAP-25 through CAP-33") in the same manner as described in Example 1. These nine adhesive films were laminated with PET-F, kept in a hot press maintained at 270° C. under no compression for 120 seconds and then kept under a pressure of 5 kg/cm². Specimens having a width of 10 mm were sampled from the so-obtained laminate films, and the T-peel test was carried out at a tensile speed of 100 mm/min in a tensile tester. Similarly, bonding strength values of the foregoing nine adhesives to PBT-F, PC-F, PAR-F and PEVA-F were measured. The obtained results are shown in Table 3.

TABLE 3

| Adhesive | Adhesion Strength (g/10 mm width: T-peel) | | | | |
|---|---|---|---|---|---|
| | PET-F | PBT-F | PC-F | PAR-F | PEVA-F |
| CAP-25 | 3980 | 3420 | 2100 | 2300 | 1620 |
| CAP-26 | 3810 | 3510 | 2170 | 2380 | 1660 |
| CAP-27 | 3620 | 3640 | 2220 | 2420 | 1696 |
| CAP-28 | 3410 | 3760 | 2360 | 2500 | 1700 |
| CAP-29 | 3200 | 3890 | 2240 | 2590 | 1730 |
| CAP-30 | 2790 | 4090 | 2180 | 2660 | 1890 |
| CAP-31 | 2560 | 4130 | 2120 | 2780 | 1890 |
| CAP-32 | 2420 | 4330 | 1990 | 3000 | 1780 |
| CAP-33 | 2330 | 4440 | 1700 | 3200 | 1720 |

EXAMPLE 3

A polyethylene terephthalate resin (PET) having an intrinsic viscosity [η] of 0.87 dl/g as measured at 30° C. in a mixed solvent comprising phenol and tetrachloroethane at a weight ratio of 60/40 was used as the resin for innermost and outermost layers, an ethylene-vinyl alchol copolymer (PEVA) having a vinyl alcohol content of 56 mole %, a residual vinyl ester concentration of 0.5 mole % and a melting point of 162° C. was used as the resin for the intermediate layer, and the adhesive CAP-33 used in Example 2 was used as the resin for the adhesive layer. A symmetric five-layer pipe having a structure of PET/CAP-33/PEVA/CAP-33/PET was prepared by melt extrusion using an extruding apparatus comprising an extruder for the innermost and outermost layers, which was provided with a full-flighted screw having a diameter of 65 mm and an effective length of 1430 mm, an extruder for the intermediate layer, which was provided with a full-flighted screw having a diameter of 38 mm and an effective length of 950 mm, an extruder for the adhesive layer, which was provided with a full-flighted screw having a diameter of 40 mm and an effective length of 1000 mm, a feed pipe and a three-resin five-layer die, and the pipe was preliminarily blow-formed in a split mold to obtain a bottomed preform having an inner diameter of 27.7 mm, a length of 138 mm and an average thickness of 3.5 mm. Incidentally, extrusion conditions were controlled so that the PET/CAP-33/PEVA weight ratio in the preform was 91/4/5.

The bottomed preform was heated by an infrared ray heater so that the highest temperature in the bottomed preform was 108° C. and the lowest temperature in the bottomed preform was 98° C., and the preform was draw-blow-formed according to the sequential biaxial draw-blow forming method so that the draw ratio in the axial direction was 2.0 and the draw ratio in the circumferential direction was 3.0, whereby a bottle (B-1) having an average thickness of 0.40 mm, an inner volume of 1040 cc and a weight of 36 g was obtained.

For comparison, a bottomed preform having the same dimensions as described above was prepared by using polyethylene terephthalate (PET) alone, and a biaxially draw-blow-formed bottle (B-2) having the same dimensions as described above was prepared in the same manner as described above.

With respect to each of the foregoing bottles, the transparency (haze), oxygen permeability and falling impact strength were determined, and occurrence of the interlaminar peeling phenomenon was checked at the falling test. The obtained results are shown in Table 4.

TABLE 4

| Bottle | Transparency (haze)* (%) | Oxygen Permeability** (cc/m$^2$·day·atm) | Falling Impact Strength (N/10)*** | Interlaminar Peeling**** |
|---|---|---|---|---|
| B-1 | 4.1 | 1.5 | 0/10 | 0/20 |
| B-2 | 4.0 | 12 | 0/10 | — |

Note
*A square sample of 30 mm × 30 mm was cut out from the barrel of the bottle, and the haze was measured according to the method of JIS K-6714.
**According to the method for measuring the oxygen permeability of a bottle, disclosed in Japanese Patent Publication No. 48459/82, the oxygen permeability was measured at 37° C. and under a relative humidity of 100% inside the bottle and a relative humidity of 20% outside the vessel.
***A bottle was filled with 1 Kg of a saline solution and was sealed by an aluminum cap. The bottle was stored in a low temperature store chamber maintained at 5° C. for 1 day. The bottle was let to fall down on a concrete surface from a height of 2 mm while the normal posture was maintained. The ratio of the number of broken bottles to the number of the total bottles tested is expressed by "N/10".
****A bottle filled and stored in the same manner as at the test for measuring the falling impact strength was similarly let to fall down while the normal posture was maintained or the recumbent posture was maintained. In case of the bottle B-1, no interlaminar peeling was observed when 10 bottles were let to fall down in the normal posture and another 10 bottles were let to fall down in the recumbent posture.

EXAMPLE 4

The copolyester CAP-6 used in Example 1 was melt-mixed with maleic anhydride-modified polypropylene having a melting point of 160° C., a density of 0.91 g/cm$^3$, a melt index of 1.5 g/10 min (as determined at 210° C. under a load of 2160 g) and a maleic anhydride content of 0.6% by weight at a weight ratio of 80/20 to form a resin mixture CAP-6-M.

The copolyester CAP-6 used in Example 1 was melt-mixed with polyethylene terephthalate having a melting point of 255° C. and an intrinsic viscosity [η] of 0.65 dl/g and a sodium salt-modified ionomer having a melt index of 0.9 g/10 min and a density of g/cm$^3$ at a weight ratio of 10/80/10 to form a resin mixture of CAP-6-I.

The copolyester CAP-6 used in Example 1 was melt-mixed with an ethylene-vinyl acetate copolymer having a melting point of 96° C., a density of 0.93 g/cm$^3$ and a vinyl acetate conent of 11% by weight at a weight ratio of 80/20 to form a resin mixture CAP-6-P.

Three films were prepared from these three resin mixtures in the same manner as described in Example 1. Then, in the same manner as described in Example 1, these three films were laminated with PET-F, PBT-F, PC-F, PAR-F or PEVA-F. These laminated films were subjected to the peeling test in the same manner as described in Example 1. The obtained results are shown in Table 5.

TABLE 5

| Adhesive | Adhesion Strength (g/10 mm width: T-peel) | | | | |
|---|---|---|---|---|---|
| | PET-F | PBT-F | PC-F | PAR-F | PEVA-F |
| CAP-6-M | 1110 | 1130 | 1120 | 1130 | 980 |
| CAP-6-I | 1280 | 1260 | 1240 | 1200 | 1100 |
| CAP-6-P | 1130 | 1140 | 1150 | 1100 | 1060 |

EXAMPLES 5 and 6

[Synthesis of Copolyester Adhesive and Formation of Sheet]

Copolyester adhesives used in these Examples were prepared by polycondensation according to the method described below, and they were formed into film samples. A glass reaction vessel was charged with predetermined amounts of corresponding acid and glycol components and about 0.04% by weight of a catalyst such as tetra-n-butyl titanate, and the mixture was heated at 200° C. with stirring and ester exchange reaction was continued for about 100 minutes while removing formed methanol. Then, the temperature was elevated to about 260° C. and polymerization was carried out under a reduced pressure of 0.1 to 0.5 mmHg for about 2 hours. The obtained copolyester was inserted between two Teflon sheets and formed into a filmy sheet having a thickness of about 200 to about 300 microns in a hot press at a temperature higher by 20° to 30° C. than the melting or softening point of the resin. The final composition of each sample was confirmed by the proton NMR analysis and gas chromatography. The obtained analysis results are shown in Tables 6 and 7. The glass transition temperature (Tg) of each sample was measured by using a thermal mechanical analysis apparatus (TMA) supplied by Rigaku Denki at a temperature-elevating rate of 10° C./min according to the customary penetration method. The obtained results are shown in Tables 6 and 7.

[Preparation of Test Piece for Adhesion Test]

As the creep-resistant resin to be bonded, there were used polyethylene terephthalate (PET) having a softening point of 265° C. and a glass transition temperature (Tg) of 80° C., polybutylene terephthalate (PBT) having a softening point of 225° C. and a glass transition temperature (Tg) of 37° C., polycarbonate (PC) having a softening point of 155° C., and an ethylenevinyl alcohol copolymer (PEVA) having a vinyl alcohol content of 69 mole %, a residual vinyl ester concentration of 0.4 mole %, a softening point of 182° C. and a glass transition temperature (Tg) of 72° C. Each of these creep-resistant resins was used in the form of a sheet having a thickness of 1.5 mm, which was formed by extrusion.

The above-mentioned copolyester adhesive sheet was inserted between two sheets of the creep-resistant resin, and the assembly was kept in a hot press maintained at a temperature higher by 20° C. than the softening point of the creep-resistant resin under application of no pressure for 120 seconds and was compressed under 5 kg/cm$^2$ for 60 seconds. Thus, laminate structures shown in Tables 6 and 7 were obtained.

Some of these laminates were monoaxially drawn at a draw ratio of 2 by a bench-scale biaxially drawing apparatus (Bistron BT-1 supplied by Iwamoto Seisakusho). The drawing temperature was 105° C. (PET), 85° C. (PBT), 170° C. (PC) or 130° C. (PEVA).

[Evaluation of Adhesion Strength]

Test pieces having a length of 100 mm and a width of 10 mm were taken out from laminated sheets just after bonding and also from drawn laminated sheets. In case of the drawn laminated sheets, the test pieces were taken out so that the longitudinal direction of the test piece was in agreement with the drawing direction. The adhesion strength was determined at room temperature at a tensile speed of 100 mm/min by the T-peel test using a tensile tester. The T-peel test was similarly carried out after the test pieces had been stored in an atmosphere of a temperature of 37° C. and a relative humidity (R.H.) of 97%. The test was conducted 5 times under the above conditions and the average peel strength was evaluated based on the arithmetic mean value at each measurement. The obtained results are shown in Tables 6 and 7.

TABLE 6-1

| | | Composition and Properties of Adhesive | | | | | | |
|---|---|---|---|---|---|---|---|---|
| | | Acid Components (mole %) | | | | Glycol Component (mole %) | | |
| | Adhesive | aromatic dibasic acids | | | $C_4$-$C_{12}$ linear or cyclic aliphatic dibasic acids | Other acids | | | Tg (°C.) |
| | | I | T | other | | | BD | other | |
| Run 1 | C1 | 5 | 20 | | A(60) | DA(15) | 80 | HG(20) | −35 |
| Run 2 | C2 | 15 | 15 | | TP(60) | DA(10) | 90 | PG(10) | −26 |
| Run 3 | C3 | 40 | | | A(30), SE(30) | | 100 | | −25 |
| Run 4 | C4 | 40 | 10 | | A(40), SE(10) | | 100 | | −12 |
| Run 5 | C5 | 50 | 20 | O(10) | SE(20) | | 80 | NG(20) | 5 |
| Run 6 | C6 | 60 | | | A(40) | | 100 | | 0 |
| Run 7 | C7 | 60 | 20 | | SE(20) | | 100 | | 3 |
| Run 8 | C8 | 70 | 10 | | Az(20) | | 95 | EG(5) | 12 |
| Run 9 | C9 | 90 | | | SE(10) | | 80 | PG(20) | 29 |
| Run 10 | C10 | 30 | 50 | | Az(10) | DA(10) | 100 | | 32 |
| Run 11 | C11 | 90 | 5 | | SE(5) | | 100 | | 37 |
| Comparative Run 1 | CE1 | | | | A(100) | | 60 | PG(40) | −30 |
| Comparative Run 2 | CE2 | | 100 | | | | | EG(100) | 80 |
| Run 12 | C12 | 40 | 50 | | A(10) | | 80 | EG(20) | 41 |

TABLE 6-2

| | Undrawn Samples | | | | | | | |
|---|---|---|---|---|---|---|---|---|
| | just after bonding | | | | after 1 month's storage at 37° C. and 97% RH | | | |
| | PET | PBT | PC | PEVA | PET | PBT | PC | PEVA |
| Run 1 | 2200 | 2300 | 2000 | 1800 | 1700 | 1400 | 1800 | 1200 |
| Run 2 | 2600 | 2700 | 2400 | 2200 | 2300 | 2200 | 2000 | 1600 |
| Run 3 | 3400 | 3700 | 2900 | 2600 | 3200 | 3300 | 2500 | 2200 |
| Run 4 | 3500 | 3500 | 3200 | 2700 | 3300 | 3400 | 2900 | 2300 |
| Run 5 | 3700 | 3900 | 2700 | 2300 | 3400 | 3700 | 2400 | 2100 |
| Run 6 | 3100 | 3200 | 2400 | 2400 | 2800 | 3000 | 2300 | 2000 |
| Run 7 | 3400 | 3600 | 2800 | 2500 | 3200 | 3500 | 2700 | 2400 |
| Run 8 | 3200 | 3500 | 2600 | 2300 | 2600 | 3300 | 2400 | 2000 |
| Run 9 | 3400 | 3600 | 2400 | 2000 | 3200 | 3000 | 2000 | 1800 |
| Run 10 | 3600 | 3800 | 2700 | 2100 | 3400 | 3500 | 2400 | 1900 |
| Run 11 | 3300 | 3500 | 2600 | 1800 | 2700 | 3200 | 1800 | 1600 |
| Comparative Run 1 | 1300 | 1600 | 1300 | 1000 | 1000 | 1400 | 900 | 600 |
| Comparative Run 2 | * | * | * | 63 | * | * | * | 35 |
| Run 12 | 3200 | 3400 | 2400 | 1700 | 2800 | 3100 | 1700 | 1100 |

*peeling impossible

TABLE 6-3

| | Samples Drawn at Draw Ratio of 2 | | | | | | | |
|---|---|---|---|---|---|---|---|---|
| | just after drawing | | | | after 1 month's storage at 37° C. and 97% RH | | | |
| | PET | PBT | PC | PEVA | PET | PBT | PC | PEVA |
| Run 1 | 1900 | 1700 | 1700 | 1300 | 1400 | 1300 | 1200 | 1000 |
| Run 2 | 2400 | 2300 | 2300 | 2000 | 2000 | 1900 | 1700 | 1400 |
| Run 3 | 3500 | 3800 | 2600 | 2400 | 3000 | 3100 | 2100 | 2100 |
| Run 4 | 3200 | 3600 | 3000 | 2500 | 2900 | 3200 | 2400 | 2200 |
| Run 5 | 3600 | 4100 | 2400 | 2000 | 3300 | 3400 | 2000 | 1800 |
| Run 6 | 2900 | 3400 | 2600 | 2200 | 2700 | 3200 | 2100 | 1700 |
| Run 7 | 3500 | 3700 | 2800 | 2400 | 3300 | 3600 | 2400 | 2200 |
| Run 8 | 3100 | 3400 | 2500 | 2200 | 2300 | 2800 | 1900 | 1800 |
| Run 9 | 2100 | 2300 | 2100 | 1600 | 1900 | 1700 | 1400 | 1300 |
| Run 10 | 2400 | 2600 | 2200 | 1800 | 2200 | 2300 | 1800 | 1300 |
| Run 11 | 1700 | 2200 | 1600 | 1600 | 1500 | 2000 | 1300 | 1100 |
| Comparative Run 1 | 400 | 800 | 700 | 800 | 200 | 500 | 600 | 300 |
| Comparative Run 2 | 4500 | 4000 | 3900 | 30 | 4100 | 3800 | 3600 | 15 |

TABLE 6-3-continued

| | Samples Drawn at Draw Ratio of 2 | | | | | | | |
|---|---|---|---|---|---|---|---|---|
| | just after drawing | | | | after 1 month's storage at 37° C. and 97% RH | | | |
| | PET | PBT | PC | PEVA | PET | PBT | PC | PEVA |
| Run 12 | 1600 | 2000 | 1500 | 1500 | 1300 | 1800 | 1100 | 800 |

TABLE 7-1

| | Composition and Properties of Adhesive | | | | | | | |
|---|---|---|---|---|---|---|---|---|
| | | Acid Components (mole %) | | | | Glycol Component (mole %) | | |
| | Adhesive | aromatic dibasic acids | | | C$_4$-C$_{12}$ linear or cyclic aliphatic dibasic acids | Other acids | BD | other | Tg (°C.) |
| | | I | T | other | | | | | |
| Run 13 | C13 | 60 | 20 | | SA(20) | | 100 | | 34 |
| Run 14 | C14 | 50 | | | GA(50) | | 70 | EG(30) | 18 |
| Run 15 | C15 | 25 | 10 | | A(65) | | 80 | PG(20) | −2 |
| Run 16 | C16 | 30 | | DPA(40) | Az(30) | | 100 | | 15 |
| Run 17 | C17 | 30 | 30 | | DDA(10) | DA(30) | 60 | HG(40) | −39 |
| Run 18 | C18 | 60 | 20 | | | MA(20) | 100 | | 38 |
| Run 19 | C19 | 60 | 20 | | | DA(20) | 100 | | −1 |
| Comparative Run 3 | CE3 | 20 | | | SE(80) | | 100 | | −46 |
| Comparative Run 4 | CE4 | | 5 | | A(80) | DA(15) | 100 | | −43 |

TABLE 7-2

| | Undrawn Samples | | | | | | | |
|---|---|---|---|---|---|---|---|---|
| | just after bonding | | | | after 1 month's storage at 37° C. and 97% RH | | | |
| | PET | PBT | PC | PEVA | PET | PBT | PC | PEVA |
| Run 13 | 3500 | 3600 | 2800 | 2600 | 3300 | 3400 | 2500 | 2300 |
| Run 14 | 3700 | 3800 | 3200 | 2300 | 3500 | 3400 | 3000 | 2000 |
| Run 15 | 2700 | 3200 | 2600 | 2400 | 2600 | 3000 | 2300 | 2100 |
| Run 16 | 3000 | 2900 | 3600 | 2500 | 2800 | 2700 | 3300 | 1800 |
| Run 17 | 3500 | 3300 | 2400 | 1800 | 2200 | 2000 | 2000 | 1000 |
| Run 18 | 2800 | 3300 | 2700 | 2100 | 1400 | 2000 | 1500 | 1200 |
| Run 19 | 2700 | 3200 | 2600 | 1500 | 2400 | 2600 | 2000 | 1200 |
| Comparative Run 3 | 2300 | 2500 | 1800 | 1500 | 800 | 1000 | 1000 | 800 |
| Comparative Run 4 | 600 | 1000 | 700 | 900 | 400 | 700 | 300 | 400 |

TABLE 7-3

| | Samples Drawn at Draw Ratio of 2 | | | | | | | |
|---|---|---|---|---|---|---|---|---|
| | just after drawing | | | | after 1 month's storage at 37° C. and 97% RH | | | |
| | PET | PBT | PC | PEVA | PET | PBT | PC | PEVA |
| Run 13 | 2700 | 2600 | 2300 | 2100 | 2400 | 2400 | 2000 | 1800 |
| Run 14 | 2600 | 3200 | 2900 | 2000 | 2400 | 2900 | 2200 | 1600 |
| Run 15 | 2400 | 2800 | 2300 | 2300 | 2200 | 2600 | 2100 | 2000 |
| Run 16 | 3300 | 3200 | 3300 | 2200 | 2600 | 2600 | 3200 | 1900 |
| Run 17 | 2800 | 2400 | 2200 | 1200 | 1900 | 1600 | 1800 | 900 |
| Run 18 | 2400 | 2700 | 2200 | 1800 | 1100 | 1600 | 1000 | 900 |
| Run 19 | 2400 | 2300 | 2100 | 1200 | 1800 | 2000 | 1700 | 1000 |
| Comparative Run 3 | 2100 | 1900 | 1600 | 1300 | 800 | 1100 | 800 | 500 |
| Comparative | 800 | 900 | 800 | 800 | 300 | 600 | 200 | 300 |

TABLE 7-3-continued

| | Samples Drawn at Draw Ratio of 2 | | | | | | | |
|---|---|---|---|---|---|---|---|---|
| | just after drawing | | | | after 1 month's storage at 37° C. and 97% RH | | | |
| | PET | PBT | PC | PEVA | PET | PBT | PC | PEVA |
| Run 4 | | | | | | | | |

Note
The abbreviations used in Tables 6 and 7 stand for the following acid or glycol components.
Acid Components
T: terephthalic acid
I: isophthalic acid
O: orthophthalic acid
DPA: diphenolic acid
TP: tetrahydrophthalic acid
MA: malonic acid
A: adipic acid
SE: sebacic acid
SA: succinic acid
AZ: azelaic acid
DA: dimer acid
GA: glutaric acid
DDA: 1,10-decane-dicarboxylic acid
Glycol Components
BD: 1,4-butane-diol
EG: ethylene glycol
PG: propylene glycol
NG: neopentyl glycol
HG: hexahydroxylylene glycol

EXAMPLE 7

A polyethylene terephthalate resin (PET) having an intrinsic viscosity [η] of 0.91 dl/g as measured at 30° C. in a mixed solvent comprising phenol and tetrachloroethane at a weight ratio of 60/40 was used as the resin for innermost and outermost layers, an ethylenevinyl alcohol copolymer (PEVA) having a vinyl alcohol content of 69 mole %, a residual vinyl ester content of 0.6 mole % and a melting point of 182° C. was used as the resin for the intermediate layer, and the copolyester adhesive C7 used in Example 5 was used as the resin for the adhesive layer. A symmetric five-layer pipe having a structure of PET/C7/PEVA/C7/PET was prepared by melt extrusion using an extruding apparatus comprising an extruder for the innermost and outermost layers, which was provided with a full-flighted screw having a diameter of 65 mm and an effective length of 1430 mm, an extruder for the intermediate layer, which was provided with a full-flighted screw having a diameter of 38 mm and an effective length of 950 mm, an extruder for the adhesive layer, which was constructed by remodeling a high-temperature type hot melt adhesive applicator provided with a gear pump, a feed pipe and a three-resin five-layer die, and the pipe was preliminarily blow-formed in a split mold to obtain a bottomed preform having an inner diameter of 27.7 mm, a length of 138 mm and an average thickness of 3.5 mm. Incidentally, extrusion conditions were controlled so that the PET/C7/PEVA weight ratio in the preform was 90/4/6.

The bottomed preform was heated by an infrared ray heater so that the highest temperature in the bottomed preform was 108° C. and the lowest temperature in the bottomed preform was 98° C., and the preform was draw-blow-formed according to the sequential biaxial draw-blow forming method so that the draw ratio in the axial direction was 2.0 and the draw ratio in the circumferential direction was 3.0, whereby a bottle (B-3) having an average thickness of 0.40 mm, an inner volume of 1040 cc and a weight of 36 g was obtained.

For comparison, a bottomed preform having the same dimensions as described above was prepared by using polyethylene terephthalate (PET) alone, and a biaxially draw-blow-formed bottle (B-4) having the same dimensions as described above was prepared in the same manner as described above.

With respect to each of the foregoing bottles, the transparency (haze), oxygen permeability and falling impact strength were determined, and occurrence of the interlaminar peeling was checked. Furthermore, with respect to the bottle B-3, the interlaminar peel strength between the PET and C7 layers in the barrel and the interlaminar peel strength between the PEVA and C7 layers in the barrel were measured. The obtained results are shown in Table 8.

When the bottle B-3 was filled with a synthetic carbonated drink and stored at room temperature for 6 months, it was found that the loss of the volume of the gas was very small and no interlaminar peeling was caused. Accordingly, it was confirmed that this bottle was practically satisfactory.

TABLE 8

| Bottle | Transparency (haze)* (%) | Oxygen Permeability** (cc/m² · day · atm) | Falling Test | | Interlaminar Peel Strength***** (g/10 mm width) | |
|---|---|---|---|---|---|---|
| | | | impact strength*** | interlaminar peeling**** | PET/C7 | C7/PEVA |
| B-3 | 4.1 | 1.0 | 0/10 | 0/20 | >1,700 | 1,700 |

TABLE 8-continued

| Bottle | Transparency (haze)* (%) | Oxygen Permeability** (cc/m² · day · atm) | Falling Test impact strength*** | Falling Test interlaminar peeling**** | Interlaminar Peel Strength***** (g/10 mm width) PET/C7 | Interlaminar Peel Strength***** (g/10 mm width) C7/PEVA |
|---|---|---|---|---|---|---|
| B-4 | 4.0 | 12 | 0/10 | — | — | — |

Note
*A square sample of 30 mm × 30 mm was taken out and the haze was measured according to the method of JIS K-6714.
**The oxygen permeability was measured according to the method described in Example 3 (Table 4).
***The impact strength was measured according to the method described in Example 3 (Table 4).
****The interlaminar peeling was checked according to the method described in Example 3 (Table 4).
*****A rectangular sample having a width of 10 mm and a length of 60 mm in the height direction of the bottle was taken out from the central portion of the barrel of the bottle, and the T-peel test was carried out at room temperature at a tensile speed of 100 mm/min by using a tensile tester.

EXAMPLE 8

The same polyethylene terephthalate (PET) as used in Example 7 was used for the polyester layer, an ethylene-vinyl alcohol copolymer (PEVA) having a vinyl alcohol content of 69.0 mole %, a residual vinyl ester content of 0.6 mole % and a melting point of 182° C. was used for the barrier layer, and the same copolyester adhesive (C7) as used in Example 7 was used for the adhesive layer. From these resins, a symmetric three-resin five-layer laminate sheet of a PET layer/C7 layer/PEVA layer/C7 layer/PET layer structure having a total thickness of 2.30 mm (PET/C7/PEVA thickness ratio=100/3/5) and a width of 400 mm was prepared by using an extruder for the polyester layer, which was provided with a screw having a diameter of 50 mm and an effective length of 1300 mm, an extruder for the adhesive layer, which was provided with a screw having a diameter of 30 mm and an effective length of 750 mm, an extruder for the barrier layer, which was provided with a screw having a diameter of 38 mm and an effective length of 950 mm, a three-resin five-layer feed block, a single manifold T-die and a five-roll sheet-forming device. The formed sheet was rapidly cooled so that crystallization was not caused in the PET layers. The density of the PET layers of the obtained sheet was lower than 1.340 g/cm³. Since the sheet could not be wound on a roll, the sheet was cut into a length of 1000 mm by a traveling cutter just after the forming operation.

The obtained sheet was heated at 100° C. by an infrared ray heater and was formed into a cup having a flange width of 5 mm, an inner mouth diameter of 60 mm, an outer bottom diameter of 40 mm and a height of 80 mm by using a plug-assist vacuum-air pressure forming machine. The average thickness of the barrel of the obtained cup was 0.39 mm and the density was 1.36 to 1.366 g/cm³, and strong orientation of crystals was observed in the radial direction of the bottom. The bottom and barrel of the obtained cup were very excellent in the transparency, and no breakage of the ethylene-vinyl alcohol copolymer layer was observed. Rectangular samples having a width of 10 mm and a length of 30 mm were taken out from the barrel and bottom of the cup, and the interlaminar peel strength was measured between the PET and C7 layers and between the PEVA and C7 layers in the same manner as described in Example 7. The obtained results are shown in Table 9.

TABLE 9

| Sample-Collecting Position | Peeling Direction* | Interlaminar Peel Strength** (g/10 mm width, T-peel) PET layer/ adhesive layer*** | Interlaminar Peel Strength** (g/10 mm width, T-peel) adhesive layer/ gas barrier layer**** |
|---|---|---|---|
| barrel | height direction of cup | 1,800 | 1,750 |
| barrel | circumferential direction of cup | 1,900 | 1,800 |
| bottom | radial direction | 2,200 | 1,950 |

Note
*The sample was taken out so that the direction of the long side of the sample was in agreement with the direction of the height of the cup, and by "height direction", it is meant that the peeling direction at the peeling test was in agreement with the above-mentioned direction of the height of the cup.
**The measurement was made on 10 samples and the mean value is shown.
***With respect to one sample vessel (cup), the interlaminar peel strength between the PET layer and adhesive layer was measured on both the outer surface side and the inner surface side, and the mean value is shown.
****With respect to one sample vessel (cup), the interlaminar peel strength between the gas barrier layer and adhesive layer was measured on both the outer surface side and the inner surface side, and the mean value is shown.

We claim:

1. A laminate structure comprising (1) a layer of a creep-resistant resin composed of ester recurring units selected from the group consisting of polyethylene terephthalate, polybutylene terephthalate, polycarbonate and polyarylate and (2) a gas barrier layer containing an olefin-vinyl alcohol copolymer, said layers (1) and (2) being laminated through (3) a thermoplastic resin adhesive layer, wherein the adhesive resin is composed of a copolyester or copolyester composition comprising in the main chain at least two acid components selected from (i) an isophthalic acid component, (ii) a terephthalic acid component and (iii) a linear or cyclic aliphatic dibasic acid component, and at least one glycol component selected from the group consisting of ethylene glycol, propylene glycol, 1,4-butane diol, neopentyl glycol, cyclohexane diol, xylene glycol and hexahydroxylene glycol, said copolyester having a glass transition temperature (Tg) of −40° to 75° C.

2. A sealing and packaging multi-layer plastic vessel formed of a laminate structure as set forth in claim 1.

3. A vessel as set forth in claim 2, which is in the form of a cup.

4. A vessel as set forth in claim 2, which is in the form of a pouch.

5. A vessel as set forth in claim 2, which is in the form of a bottle.

6. A vessel as set forth in claim 5, wherein the vessel wall is molecularly oriented in at least one direction.

7. A laminate structure as set forth in claim 1, wherein the creep-resistant resin is a polyester composed mainly of ethylene terephthalate units.

8. A laminate structure as set forth in claim 1, wherein the creep-resistant resin is a polyester composed mainly of butylene terephthalate units.

9. A laminate structure as set forth in claim 1, wherein the creep-resistant resin is a polycarbonate.

10. A laminate structure as set forth in claim 1, wherein the creep-resistant resin is a polyarylate.

11. A laminate structure as set forth in claim 1, wherein the olefin-vinyl alcohol copolymer is a saponified copolymer obtained by saponifying an ethylene-vinyl acetate copolymer having an ethylene content of 20 to 60 mole % to a saponification degree of at least 95%.

12. A laminate structure as set forth in claim 1 wherein said at least one glycol component comprises 1,4-butane diol or a combination of 1,4-butane diol with at least one glycol component selected from the group consisting of ethylene glycol, propylene glycol, neopentylglycol, cyclohexane diol, xylene glycol and hexahydroxylene glycol.

13. A laminate structure as set forth in claim 1, wherein the adhesive resin is a copolyester or copolyester composition comprising at least 25 mole % of an aromatic dibasic acid component and 5 to 75 mole % of a linear or cyclic aliphatic dibasic acid component.

14. A laminate structure as set forth in claim 13, wherein the aliphatic dibasic acid component has 4 to 12 carbon atoms.

15. A laminate structure as set forth in claim 13, wherein the copolyester or copolyester composition comprises as the glycol component a 1,4-butane-diol component.

16. A laminate structure as set forth in claim 13, wherein the aromatic dibasic acid component is an isophthalic acid component.

17. A laminate structure as set forth in claim 1, wherein the adhesive resin is composed of a thermoplastic copolyester or copolyester composition containing in the main chain terephthalic acid and isophthalic acid components as the dibasic acid component.

18. A laminate structure as set forth in claim 17, wherein the copolyester or copolyester composition contains an isophthalic acid component in an amount of at least 5 mole % based on the total dibasic acid component.

19. A laminate structure as set forth in claim 17, wherein the thermoplastic copolyester is polybutylene terephthalate/isophthalate.

20. A laminate structure as set forth in claim 17, wherein the thermoplastic copolyester is polyethylene terephthalate/isophthalate.

21. A laminate structure as set forth in claim 17, wherein the thermoplastic copolyester composition is a mixture of polybutylene terephthalate/isophthalate and polyethylene terephthalate/isophthalate.

22. The laminate structure as set forth in claim 1 wherein the adhesive resin consists essentially of the copolyester or a mixture of two or more of said copolyesters or a mixture of said copolyester with up to 30% by weight, based on the total adhesive, of an olefinic thermoplastic resin.

23. The laminate structure as set forth in claim 22 wherein the olefinic thermoplastic resin is selected from the group consisting of polyethylene, polypropylene, an ethylene-propylene copolymer, an ethylene-butene-1 copolymer, an ion-crosslinked olefin copolymer (ionomer), an ethylene-vinyl acetate copolymer, an ethylene-acrylic acid copolymer, an ethylene-ethylacrylate copolymer, an acid-modified polyethylene and acid-modified polypropylene.

* * * * *